United States Patent Office 3,324,182
Patented June 6, 1967

3,324,182
PENTA-ALKYLDIALKYLENETRIAMINES
Ralph E. De Brunner, Edward S. Blake, and James A. Webster, Dayton, Ohio, assignors to Monsanto Research Corporation, St. Louis, Mo., a corporation of Delaware
No Drawing. Filed Dec. 28, 1964, Ser. No. 421,660
7 Claims. (Cl. 260—583)

This application is a continuation-in-part of our copending application Ser. No. 247,341, filed Dec. 26, 1962, now abandoned.

This invention relates to tertiary polyamines and more particularly provides new and valuable derivatives of certain dialkylenetriamines and the method of preparing the same. The invention also provides methods of actuating power-transmitting devices wherein said tertiary amines serve as functional fluids.

According to the invention, the presently provided amine compounds are prepared by reaction of a dialkylenetriamine with an alkyl halide of from 4 to 6 carbon atoms, substantially according to the scheme:

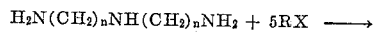
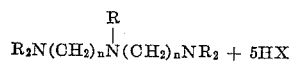

$$H_2N(CH_2)_nNH(CH_2)_nNH_2 + 5RX \longrightarrow$$
$$R_2N(CH_2)_n\underset{|}{N}(CH_2)_nNR_2 + 5HX$$
$$R$$

wherein R is alkyl of from 4 to 6 carbon atoms, X is halogen having an atomic weight greater than 19 and $n$ is 2 to 4.

The useful halides include chlorides, bromides, or iodides. Examples thereof are n-butyl chloride, sec-butyl bromide, n-pentyl chloride, isopentyl bromide, n-hexyl chloride, 2-ethylbutyl bromide, isohexyl iodide, etc. Thus, reaction of diethylenetriamine with n-butyl iodide yields 1,1,4,7,7-penta-n-butyldiethylenetriamine; with sec-butyl bromide there is obtained 1,1,4,7,7-penta-sec-butyldiethylenetriamine; with n-pentyl or isopentyl bromide there is obtained 1,1,4,7,7-penta-n- or iso-pentyldiethylenetriamine; with n-hexyl chloride or bromide there is obtained 1,1,4,7,7-penta-n-hexyldiethylenetriamine, etc. Reaction of dipropylenetriamine (alternately named as 3,3'-diamminodipropylamine, but herein referred to as dipropylenetriamine) with n-butyl bromide yields 1,1,5,9,9-penta-n-butyldipropylenetriamine; with n-hexyl bromide there is obtained 1,1,5,9,9-penta-n-hexyldipropylenetriamine, etc. Reaction of dibutylenetriamine (alternately named as 4,4'-diaminodi-n-butylamine, but herein referred to as dibutylenetriamine) with 2-ethylbutyl bromide yields 1,1,6,11,11-penta - 2-ethylbutyldibutylenetriamine; with n-pentyl chloride there is obtained 1,1,6,11,11-penta-n-pentyldibutylenetriamine, etc.

By first employing less than the stoichiometrically required quantity of a $C_4$-$C_6$ alkyl halide and then reacting the partially alkylated product thus obtained with a halide having a different $C_4$-$C_6$ alkyl radical, there are provided mixed 1,1,4,7,7-pentaalkyldiethylenetriamines such as 1,1,7,7-tetra-n-butyl-4-hexyldiethylenetriamine, or 1,7-dihexyl-1,4,7-tri-n-pentyldiethylenetriamine or 1,1-diisobutyl - 7,7-di-n-hexyl - 4-pentyldiethylenetriamine. Mixed alkyl derivatives of dipropylenetriamine and dibutylenetriamine are similarly obtained.

Reaction of the diethylenetriamine with the $C_4$-$C_6$ alkyl halide takes place by simply contacting the triamine with the halide at ambient temperatures or by heating. Temperatures of from, say, 50° C. to refluxing are advantageously employed. Generally, temperatures of from about 40° C. to 140° C. are useful.

Advantageously, the reaction is conducted in the presence of an inert, organic liquid diluent or solvent, and when such diluent or solvent is employed, operation at the refluxing temperature of the reaction mixture, at least toward the end of the reaction, is a convenient means of assuring completion of the reaction within an economically feasible length of time. Examples of suitable diluents are the lower alkanols, e.g., methanol, ethanol or isopropanol; ethers such as dioxane or ethyl ether; diglyme, amides such as dimethylformamide or dimethylacetamide, etc.

A catalyst may or may not be used. Operation in the presence of a basic agent is recommended, since it serves as scavenger for the by-product hydrogen halide. The basic agent may be inorganic or organic, but obviously it should not be one which contains labile hydrogen, for such a material would tend to react with the alkyl halide, e.g., an extraneous primary or secondary amine should not be used as hydrogen halide scavenger. Examples of suitable basic agents in presence of which the reaction is conducted are, e.g., alkali or alkaline earth metal oxides or basic salts such as sodium, potassium, lithium, rubidium, calcium, barium or magnesium oxides, carbonates, acetates, etc.

All of the reaction conditions, i.e., whether or not diluent is employed and the nature of the diluent if one is used, basic agent, temperature, etc., can be readily arrived at by easy experimentation. Progress of the reaction can be followed by sampling the reaction mixture at intervals and determining the content of the desired product, e.g., by spectrochemical analysis, boiling point, etc. To assure complete reaction in experimental runs, it is generally recommended that the temperature of the reaction mixture be increased after sufficient time has elapsed for any exothermic reaction to have occurred. Thus, arrival at optimum reaction conditions is simply a matter of routine procedure by one skilled in the art.

Since formation of the presently provided pentaalkyldialkylenetriamines proceeds by replacement of the five nitrogen-borne hydrogens of the triamine with $C_4$-$C_6$ alkyl radicals, the dialkylenetriamine and the alkyl halide are employed in a 1:5 molar ratio in order to obtain good yields of the pentaalkyldialkylenetriamines. However, since introduction of one or more alkyl groups favors subsequent substitution, some of the pentaalkyl compound is formed invariably, irrespective of reactant proportions. Employing, say, a 1:2 molar ratio of triamine and halide, the pentaalkyldialkylenetriamine is formed together with products of various lower degrees of substitution. The pentaalkyl compound is readily separated from such other products by fractional distillation, crystallization, solvent extraction, etc. To assure a product consisting of only the pentaalkyldialkylenetriamine, an excess of the alkyl halide over the 1:5 triamine-halide molar ratio is desirable. Such excess can be readily separated from the alkylated amine by known isolating procedures.

The 1,1,4,7,7-pentaalkyldiethylenetriamines are also obtained by reductive alkylation of diethylenetriamine with a $C_4$-$C_6$ alkanecarboxaldehyde in the presence of a reducing catalyst, e.g., platinum or nickel. Thus, with butyraldehyde, the reaction occurs as follows:

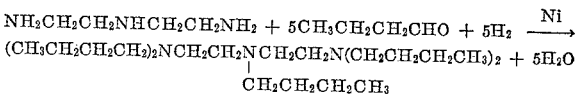

$$NH_2CH_2CH_2NHCH_2CH_2NH_2 + 5CH_3CH_2CH_2CHO + 5H_2 \xrightarrow{Ni}$$
$$(CH_3CH_2CH_2CH_2)_2NCH_2CH_2\underset{|}{N}CH_2CH_2N(CH_2CH_2CH_2CH_3)_2 + 5H_2O$$
$$CH_2CH_2CH_2CH_3$$

Isobutyraldehyde, valeraldehyde, isovaleraldehyde and hexanal react similarly.

The presently provided pentaalkyldialkylenetriamines are clear, viscous fluids over a wide temperature range and possess very good thermal stability. Some of them remain liquid at a temperature which may be as low as —100° F. and remain liquid at temperatures which are substantially higher than 500° F. Hence they are eminently suited for use as hydraulic fluids, e.g., as brake fluids, clutch fluids and control fluids generally in power transmitting mechanisms. Their low vapor pressure recommends them for use as a functional fluid at high altitude flying. The present compounds also possess very good lubricating properties and demonstrate a film strength which results in decreased wear of metal parts. The good lubricity and load-carrying properties of the compounds, together with their low pour-point and high thermal stability thus recommend them for use as lubricants for aircraft turbine engines. The present compounds are useful as lubricants for gear and bearing systems, generally, in that they possess not only good viscosity over great temperature ranges, but also extremely good anti-wear property.

The presently provided pentaalkyldialkylenetriamines may be used alone as the functional fluid or they may be admixed with known fluids, e.g., petroleum lubricants or synthetic lubricants of the polyester or silane types. They may also be admixed with additives generally employed with lubricants and other functional fluids, e.g., antioxidants, anticorrosive agents, defoamants, etc., although for many purposes the use of such additives will be found to be unnecessary.

The invention is further illustrated by, but not limited to, the following examples:

*Example 1*

A mixture consisting of 51.6 g. (0.5 mole) of diethylenetriamine, 495.2 g. (3.0 mole) of n-hexylbromide, 345 g. (2.5 mole) of anhydrous potassium carbonate and 750 ml. of 95% ethanol was slowly warmed, with stirring to 75–80° C., and held at this temperature for 26 hours. The reaction mixture was then cooled and filtered to remove inorganic salts. The salts were washed several times with benezene and the benzene washings were combined with the organic layer. The combined material was distilled at atmospheric pressure to remove ethanol and benezene, and the residue was washed once with 1 N potassium hydroxide, then twice with water and azeotroped with benzene to dryness. Upon cooling, a solid precipitated. This was filtered off, and the residual organic material was washed once with 20% aqueous sodium hydroxide, twice with water, and again dried by azeotroping with benzene. Distillation of the dried product gave the substantially pure 1,1,4,7,7-penta-n-hexyldiethylenetriamine, B.P. 213° C./0.12 mm., $n_D^{25}$ 1.4578, and analyzing as follows:

Calc'd for $C_{34}H_{73}N_3$: C, 77.94%; H, 14.04%; N, 8.02%. Found: C, 77.87%; H, 14.09%; N, 8.21%.

Infra-red analysis gave a spectrum consistent with tertiary amine structure, and no evidence of primary or secondary amine.

Testing of the 1,1,4,7,7-pentahexyldiethylenetriamine for efficacy as a functional fluid was conducted by determining such characteristics as kinematic viscosity, pour point, decomposition point and vapor pressure.

Kinematic viscosity was determined by ASTM D445–T 1960 procedure employing standard ASTM kinematic viscosity thermometers calibrated against a National Bureau of Standards resistance thermometer. The following results were obtained at the indicated temperatures:

| Temp., °F.: | Centistokes |
|---|---|
| —65 | 6,584 |
| 0 | 237.8 |
| 100 | 15.96 |
| 210 | 3.73 |

The pour point, determined by ASTM D97–57 procedure, was found to be —100° F.

Vapor pressure and thermal stability measurements, employing the isoteniscope, constant temperature bath and vacuum-gas handling system were conducted using substantially the method described by E. S. Blake et al., J. Chem. Eng. Data, 6, 87 (1961). The decomposition temperature of the 1,1,4,7,7-penta-n-hexyldiethylenetriamine is thus found to be 545° F. (285° C.). Temperatures for vapor pressure equal to certain pressures of mercury were determined to be as follows:

| Temp., °F.: | Mm. |
|---|---|
| 509 | 10 |
| 608 | 100 |
| 702 | 600 |
| 714 | 760 |

The anti-wear lubrication characteristics of the 1,1,4,7,7-penta-n-hexyldiethylenetriamine were evaluated by means of the "Shell 4-Ball Tester." This apparatus consists of four balls of stainless steel arranged in the form of an equilateral tetrahedron. The basic elements are three lower balls held immovably in a clamp to form a cradle in which a fourth or upper ball is caused to rotate about a vertical axis under prescribed conditions of load and speed. The contacting surfaces on the four-ball type apparatus are well defined, thus providing obvious advantages in the study of wear and friction phenomena. The points of contact are lubricated by the fluid under test, which is held in a cup surrounding the four-ball assembly. The diameters of the circular scars worn in the surface of the three stationary balls were measured. At 1860 r.p.m., a load of 40 kg. and a temperature of 167° F., during 60 minutes, there was thus obtained a scar diameter value of 0.858 mm. for the 1,1,4,7,7-penta-n-hexyldiethylenetriamine. Using the same testing procedure with bis(2-ethylhexyl) sebacate, a known polyester lubricant, there was obtained a scar diameter value of 1.01 mm.

*Example 2*

A mixture consisting of 51.6 g. (0.5 mole) of diethylenetriamine, 411.1 g. (3.0 mole) of n-butyl bromide, 345 g. (2.5 mole' of anhydrous potassium carbonate and 750 mol. of 95% ethanol was slowly warmed to 75° C. and held at that temperature for 67 hours. It was then filtered, the precipitate washed with benzene and the combined filtrate and washings were distilled to remove the alcohol, benzene, water and any unreacted butyl bromide. The residue, which partially crystallized upon cooling, was treated with aqueous potassium hydroxide and then dried by azeotropic distillation with benzene. Distillation of the dried organic material through an 18″ Vigreux column gave the substantially pure 1,1,4,7,7-penta-n-butyldiethylenetriamine, B.P. 150–153° C./0.4 mm., which upon redistillation gave the purer, colorless product, B.P. 150° C./0.01 mm., $n_D^{25}$ 1.4525, and analyzing as follows:

Calc'd for $C_{24}H_{53}N_3$: C, 75.07%; H, 13.93%; N, 10.95%. Found: C, 74.88%; H, 14.09%; N, 10.63%.

Cryoscopic molecular weight determination gave a value of 379, as against 384, the calculated molecular weight for $C_{24}H_{53}N_3$.

Determination of the kinematic viscosity of the 1,1,4,7,7-penta-n-butyldiethylenetriamine, using the procedures described in Example 1, gave the following values:

| Temperature, °F.: | Centistokes |
|---|---|
| —65 | 1898 |
| 0 | 84.8 |
| 100 | 7.38 |
| 210 | 2.13 |

An ASTM slope of 0.76 was determined.

The pour point, determined as in Example 1, was found to be —110° F.

*Example 3*

A mixture consisting of 43.3 g. (0.33 mole) of 3,3′-diaminodipropylamine (alternately referred to as dipropylenetriamine) 279.0 g. (1.69 moles) n-hexylbromide, 229 g. (1.66 moles) of anhydrous potassium carbonate and 500 ml. of 95% ethanol was heated at 75–80° C. for 17 hours. The reaction mixture was then cooled and filtered to remove solids, and distilled to remove alcohol. The stripped material contained a few grams of solids which were filtered off. Distillation yielded substantially pure 1,1,5,9,9-penta-n-hexyldipropylenetriamine alternately named as N,N-bis[3-(di-n-hexylamino)propyl]-n-hexylamine, B.P. 210° C./0.08 mm., $n_D^{25}$ 1.4596, and analyzing as follows:

Calc'd for $C_{36}H_{77}N_3$: C, 78.40%; H, 13.97%; N, 7.62%. Found: C, 78.61%; H, 14.11%; N, 7.47%.

Infrared analysis gave a spectrum consistent with tertiary amine structure, and no evidence of primary or secondary amine.

*Example 4*

A mixture consisting of 131 g. (1.0 mole) of 3,3'-diaminodipropylamine, 959 g. (7.0 moles) of n-butyl bromide, 690 g. (5.0 moles) of anhydrous potassium carbonate and 1500 ml. of 95% ethanol was stirred at room temperature for 16 hours, then at 75–80° C. for 24 hours. The reaction mixture was then cooled and filtered to remove solids, and distilled to remove alcohol and other volatiles up to 170° C./25 mm. The crude product was shaken with NaOH pellets and left standing. Two layers formed, of which the upper was distilled to yield substantially pure 1,1,5,9,9-penta-n-butyldipropylenetriamine alternately named as N,N-bis[3-(di-n-butylamino)propyl]-n-butylamine, B.P. 168° C./0.25 mm., $n_D^{25}$ 1.4555.

Determination of the kinematic viscosity of the 1,1,5,9,9-pentabutyldipropylenetriamine, using the procedures described in Example 1, gave the following values:

| Temperature, °F.: | Centistokes |
|---|---|
| −40 | 977 |
| 100 | 10.65 |
| 210 | 2.61 |

An ASTM slope of 0.79 was determined.

The pour point, determined as in Example 1, was found to be −100° F.

It is to be understood that although the invention has been described with specific reference to particular embodiments thereof, it is not to be so limited since changes and alterations therein may be made which are within the full intended scope of this invention as defined by the appended claims.

We claim:
1. A compound of the formula

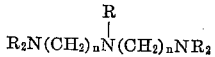

wherein R is alkyl of from 4 to 6 carbon atoms and $n$ is 2 to 4.

2. A compound of the formula

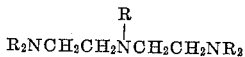

wherein R is alkyl of from 4 to 6 carbon atoms.

3. A compound of the formula

wherein R is alkyl of from 4 to 6 carbon atoms.

4. 1,1,4,7,7-pentabutyldiethylenetriamine.
5. 1,1,4,7,7-pentahexyldiethylenetriamine.
6. 1,1,5,9,9-pentabutyldipropylenetriamine.
7. 1,1,5,9,9-pentahexyldipropylenetriamine.

References Cited

UNITED STATES PATENTS

| | | | |
|---|---|---|---|
| 2,243,329 | 5/1941 | De Groote et al. | 260—583 X |
| 2,267,205 | 12/1941 | Kyrides | 260—583 X |
| 2,390,766 | 12/1945 | Zellhoefer et al. | 260—583 X |
| 3,013,382 | 12/1961 | Doss | 260—583 |

FOREIGN PATENTS 493,897  8/1950  Belgium.

CHARLES B. PARKER, *Primary Examiner.*
RICHARD L. RAYMOND, *Assistant Examiner.*